United States Patent [19]

Kulka

[11] 4,214,168
[45] Jul. 22, 1980

[54] TRAFFIC LIGHT AND MOTOR VEHICLE TAILLIGHT LENSES

[76] Inventor: Thomas S. Kulka, 200 Film Bldg., 2108 Payne Ave., Cleveland, Ohio 44114

[21] Appl. No.: 941,683

[22] Filed: Sep. 12, 1978

Related U.S. Application Data

[63] Continuation of Ser. No. 727,662, May 29, 1976, abandoned, which is a continuation-in-part of Ser. No. 563,322, Mar. 31, 1975, abandoned.

[51] Int. Cl.$^2$ .............................................. B60Q 1/00
[52] U.S. Cl. .................................... 362/311; 362/351; 362/211; 340/84; 362/235
[58] Field of Search ................ 362/64, 211, 235–237, 362/240, 244, 307–311, 351, 355–356; 340/22, 84, 93

[56] References Cited

U.S. PATENT DOCUMENTS

| 1,236,137 | 8/1917 | Bastow | 362/355 |
| 1,244,734 | 10/1917 | Higgins | 362/355 |
| 1,594,004 | 7/1926 | Diesel | 362/355 |
| 1,626,615 | 5/1927 | Kirby et al. | 362/309 |
| 1,675,767 | 7/1928 | Rich et al. | 362/355 |
| 1,764,474 | 6/1930 | Shippee | 362/309 |
| 1,923,181 | 8/1933 | Albers | 362/214 |
| 1,945,190 | 1/1934 | Handlan | 362/309 X |
| 2,380,691 | 7/1945 | Gross | 240/8.3 |
| 2,699,515 | 1/1955 | Williams | 362/308 X |

Primary Examiner—J. D. Miller
Assistant Examiner—Peter S. Wong
Attorney, Agent, or Firm—Schwartz, Jeffery, Schwaab, Mack, Blumenthal & Koch

[57] ABSTRACT

A traffic signal having a light which includes lens means formed with perforations extending through the lens means and arranged in a predetermined pattern whereby light transmission through the lens means in accordance with the pattern facilitates recognition of the signal by oncoming motorists. The perforations are formed in the lens itself or in a cover member or cap for the lens. The invention is particularly useful for colorblind persons or persons who have impaired vision. In one form of the invention a plurality of the signals are arranged on a traffic standard with sequentially actuated lights, while in a second form the signal is mounted on the rear portion of an automobile to supplement or replace the conventional taillights.

17 Claims, 25 Drawing Figures

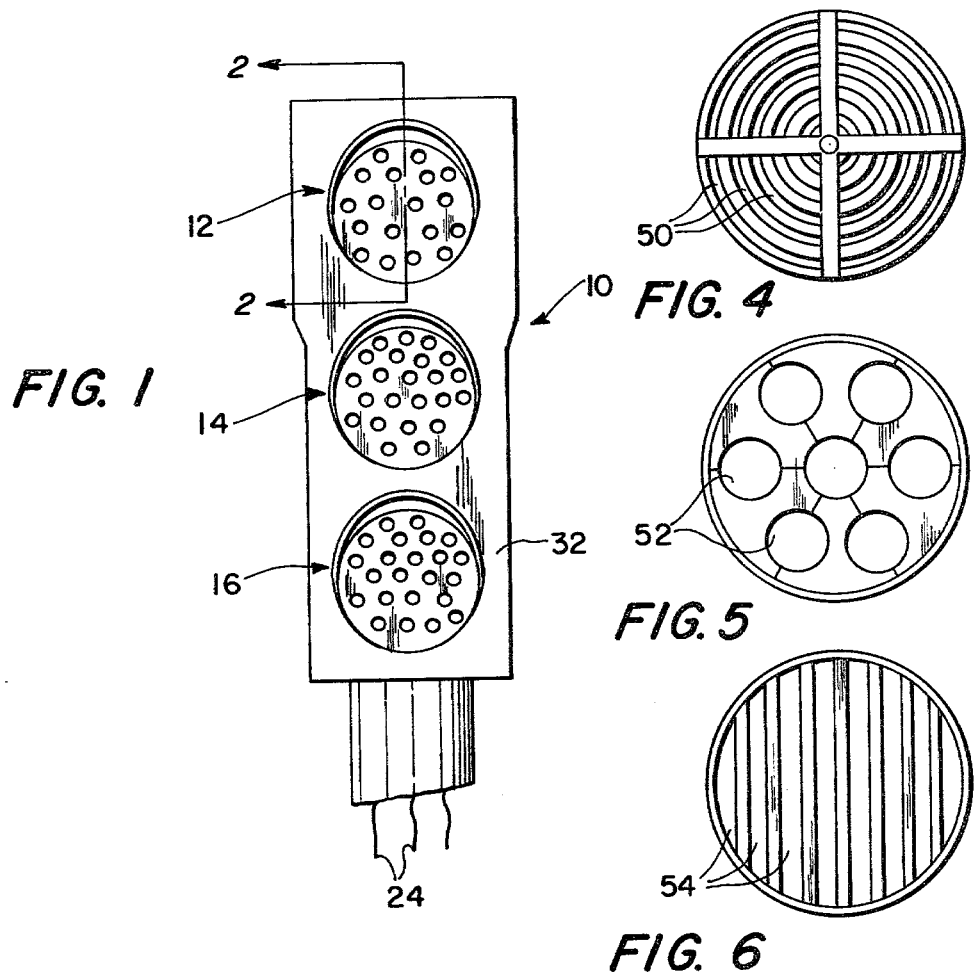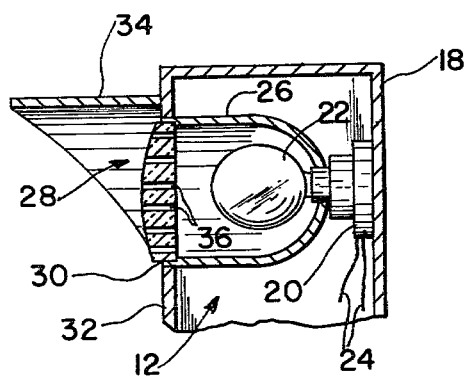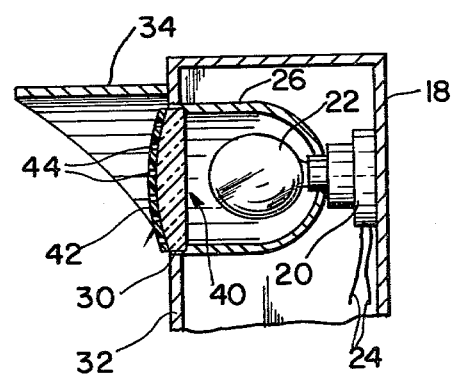

TRAFFIC LIGHT AND MOTOR VEHICLE TAILLIGHT LENSES

REFERENCE TO PARENT APPLICATION

This is a continuation-in-part of copending application Ser. No. 563,322, filed Mar. 31, 1975. This is a continuation, of application Ser. No. 727,662, filed May 29, 1976 now abandoned.

BACKGROUND OF THE INVENTION

The present invention relates as indicated to a traffic light lens, and relates more particularly to a lens for a traffic light or signal or automobile taillight in which the light is transmitted through the lens in a predetermined pattern thereby facilitating recognition of the light by oncoming motorists approaching the traffic signal or taillight.

It is a well known fact that many drivers are color-blind and are thus not able to distinguish the "green" and "red" lights on the ordinary traffic signal. This is particularly true during bright sunny days when it is difficult to detect the lights with good vision and where the lenses of traffic lights and automobile taillights have accumulated dust and dirt which impairs the light transmission to a considerable extent through the lens. These conditions are also a hindrance to drivers who are not color-blind but do have some impairment in their vision, not sufficient, however, to prevent their lawful driving of a motor vehicle.

The above indicated problems to color-blind drivers and to drivers having somewhat impaired vision have been recognized in the prior art, and several attempts have been made to facilitate signal light detection by such persons. Attention is directed to U.S. Pat. No. 2,228,835 to W. H. Leppert which discloses a traffic signal in which the red, amber and green lenses are of a particular shape to facilitate detection by the oncoming motorists apart from the color of the light transmitted through the lens. U.S. Pat. No. 2,341,862 to M. Garland likewise discloses a traffic signal in which the ordinary lens has been replaced by a lens which is sectioned for transmitting therethrough light in predetermined and distinct paths thereby to provide a distinctive optical effect upon the eyes of the motorists. Additional patents which provide for arrangements for enhancing recognition of a traffic light include U.S. Pat. No. 3,688,259 to M. Rebillt which discloses an annular light around each lens of the traffic light of a distinguishing color so as to highlight the lens which is sequentially operated, and U.S. Pat. No. 2,190,035 to A. M. Loungway, which provides a series of light bulbs disposed around the signal lens, which bulbs are progressively lighted for the primary purpose of indicating to the oncoming motorists the remaining time in which the light will remain before the light signal is changed.

Although the above discussed prior art does accomplish the general purpose intended, the traffic signals are uniformly characterized by their relatively high cost. The ordinary traffic signals must either be substantially modified to include additional light transmitting equipment or the ordinary equipment must be entirely replaced so that in either event installation costs are increased. Futhermore, such signals are not readily modifiable for use as motor vehicle taillights.

SUMMARY OF THE PRESENT INVENTION

With the above in mind, the principle object of the present invention is to devise a novel traffic light lens which can be constructed at substantially the same cost as existing traffic light lenses of the same general type.

A further, more specific object of the present invention is to provide in one embodiment a traffic light lens in which light is transmitted therethrough in predetermined patterns much more easily recognized by color-blind or visually impaired motorists than ordinary lenses in which the light transmission is entirely through lenses which are colored to correspond to the traffic light controls, with the colors normally being red, amber and green. In a second embodiment, a motor vehicle taillight-lens is provided wherein light is transmitted therethrough in predetermined patterns for easy identification by motorists. In one form of the invention, the traffic light or taillight lens is formed with a plurality of perforations which extend through the thickness of the lens, with the light being transmitted through such perforations and readily visible to the oncoming motorist thereby alerting his attention as to which of the traffic signals are actuated. In accordance with a further form of the invention, the ordinary traffic lens or taillight lens is provided in combination with a cover member preferably formed of plastic, which cover member is similarly perforated in predetermined pattern so as to transmit light therethrough in such patterns to facilitate the viewing of such light by the oncoming motorist.

These and other objects will become apparent from the following descriptions as it proceeds with particular reference to the application drawings.

BRIEF DESCRIPTION OF THE APPLICATION DRAWINGS

FIG. 1 is a front elevational view, partially fragmented, of a traffic signal including a lens constructed in accordance with the present invention;

FIG. 2 is a cross-sectional view taken on line 2—2 of FIG. 1;

FIG. 3 is a cross-sectional view similar to FIG. 2 showing a modified form of the invention;

Figure 23:
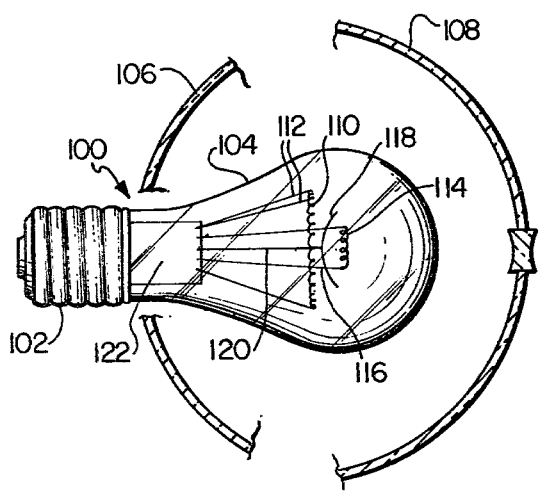
Figure 24:
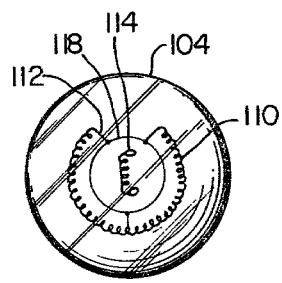
Figure 25:
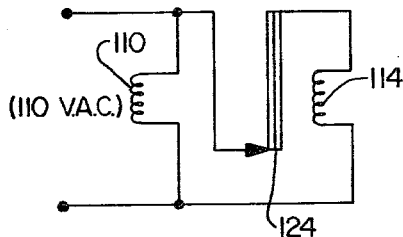

FIGS. 4–17 comprise further modifications of the invention in which the lens or cover member for the lens is perforated in accordance with predetermined patterns;

FIGS. 18–22 comprise further modifications of the invention in which the lens or cover member for the lens is provided with one or more segments having magnifying or diffusing properties;

FIGS. 23 and 24 show a bulb arrangement for illuminating the lenses of the present invention with optimum effect; and FIG. 25 shows a circuit for the bulb of FIGS. 23 and 24 which will cause flashing of one of the filaments thereof.

DETAILED DESCRIPTION OF THE PREFERRED EMBODIMENTS

Referring now in more detail to the application drawings, wherein like parts are indicated by like reference numerals, and initially to FIGS. 1 and 2, the traffic signal is generally indicated at 10 and comprises, in conventional manner, three separate lights, generally indicated at 12, 14 and 16. These traffic lights respectively designate "stop", "caution", and "go" conditions of traffic direction and appear red, amber and green, respectively, to the oncoming motorist.

The traffic signal includes a housing 18 in which are mounted light sockets 20 and a light bulb 22 for sequentially illuminating the lights, with electrical wiring 24 being connected to each socket for actuating in sequence the light bulbs. Mounted on each socket 20 is a reflector member 26 which serves to reflect and direct the light emanating from the bulb 22 for passage through a lens generally indicated at 28. The leading end of the reflector member 26 and the lens 28 are mounted in an opening 30 provided therefor in the front wall 32 of the housing 18. A curved visor member 34 is secured to the front wall of the housing so as to direct the light transmitted through the lens 28 generally forward of the traffic signal in a well-known manner.

Except for the lens 28, the structure just described is conventional as is the operation of the traffic signal in which the lights 12, 14 and 16 are sequentially operated for displaying in sequence the red, amber and green light conditions for traffic control. As can be seen in FIGS. 1 and 2, the lens 28 is formed with a series of perforations commonly designated at 36 which extend entirely through the lens and which are randomly spaced to provide numerous spaced paths of direct light transmission from the bulb 22. The lens 36 can be formed of any suitable matter, for example, glass or plastic, and the openings 36 can be formed in the lens during manufacture thereof. The lens can be colored red, amber or green to perform the normal function of traffic control, with FIG. 2 illustrating the traffic light 12 in which the lens 28 would be red in color. Although only traffic light 12 has been illustrated in FIG. 2, it will be understood that the lights 14 and 16 are constructed in the same manner.

It will thus be seen that when the light bulb 22 on traffic light 12 is energized so as to display to the oncoming motorist a "stop" condition, light will be transmitted generally through the red lens 28 and simultaneously through openings 36, with the latter being white or essentially colorless depending upon the construction of the bulb 22. Such light transmission through the openings 36 will, to an oncoming motorist approaching the traffic signal, create an illusion of motion of the openings or perforations 36 since the line of vision of the motorist of any particular perforation in the lens is constantly changing. Thus, as the motorist approaches the traffic signal, the constantly changing illumination permits the motorist to readily determine which of the traffic lights is in operational sequence thereby greatly facilitating signal detection to persons who are either color-blind or have somewhat impaired vision. By determining which of the three traffic lights the light is being projected through, the motorist can determine which of the three traffic light conditions exists as he approaches the traffic signal, based only on his knowledge of the normal traffic control arrangement of red, amber and green arranged vertically in that manner, and with total disregard of the lens which might be illuminated in the traffic sequence. In actuality, however, the motorist is normally also able to detect which of the traffic lights is illuminated by the normal illumination through the colored lens for the particular light. If desired, the light bulbs may be connected for intermittent flashing so as to further aid the motorist in determining which of the traffic light conditions exists.

A modified form of the invention is illustrated in FIG. 3, with the parts previously described being designated in FIG. 3 by the same reference numerals. In the FIG. 3 form, the lens 40 is of conventional shape, and the perforations are formed in an outer lens cap or cover member 42, which may either be mounted adjacent to the lens or, if desired, bonded or secured to the face of the lens in any suitable manner. The pattern of perforations 44 may be similar to the pattern of perforations 36 formed in the lens 28 of the FIGS. 1-2 form of the invention. The lens 40 is preferably made of clear plastic or glass so as to transmit clear light therethrough, although the lens could be translucent as well. If desired, lens 40 may be the face of a reflector-type bulb having reflector, light filament and lens all integrally connected to form a single incandescent bulb. The cover member or cap 42 is colored red, amber or green for signal purposes. The lens cover 42 may be constructed either of glass or plastic and can be secured to the lens 40 in any suitable manner, as noted. The cap 42 can be translucent or even opaque, with the signal detection in the last instance being solely through the perforations in the cover.

There are shown in FIGS. 4-17 different types of patterned perforations formed either in the lens 28 of the FIGS. 1-2 form of the invention or the lens cover member 42 of the FIG. 3 form of the invention. Thus, in FIG. 4, the perforations are in the form of regularly spaced spiral segments commonly designated at 50; in FIG. 5 relatively enlarged circular openings commonly designated at 52 are formed in the lens or cover member, and in FIG. 6 vertical, spaced openings 54 are formed in the lens or cover member. It will be understood that the openings 54 could be horizontally arranged as well as vertical as shown. The light transmitted directly from the light source through the lens or lens cover member will be more concentrated than in the FIGS. 1-3 forms of the invention but will provide the same advantage of presenting a constantly changing light pattern as the motorist approaches the traffic signal thereby facilitating detection of the actuated traffic light.

Figure 7:
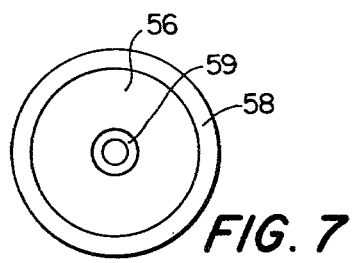
Figure 8:
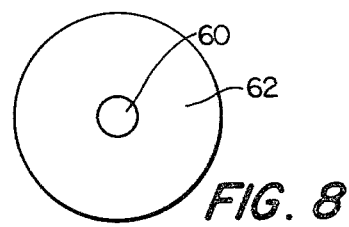
Figure 9:
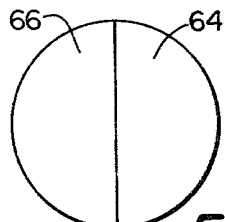
Figure 10:
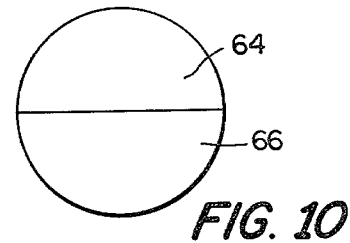
Figure 11:
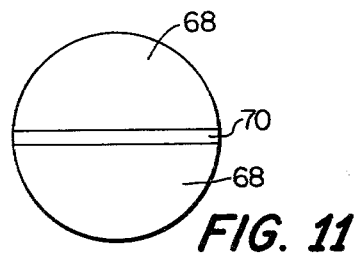
Figure 12:
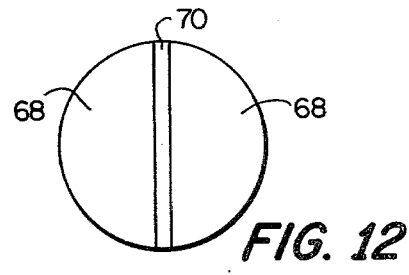
Figure 13:
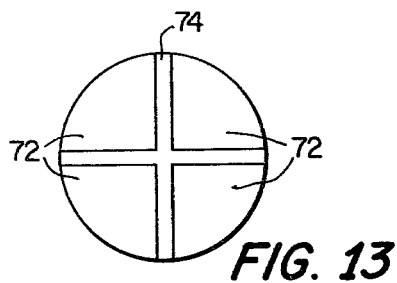
Figure 14:
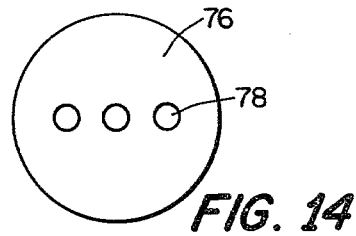
Figure 15:
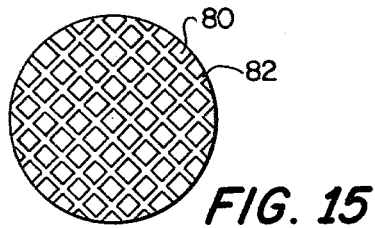
Figure 16:
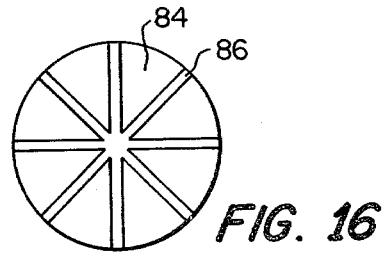
Figure 17:
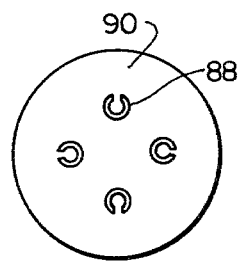

In FIG. 7, the lens 56 is substantially solid-colored but has a clear annular portion 58 at the edge and a clear annular portion 59 near the center. FIG. 3 shows a similar arrangement wherein the clear lens portion 60 of relatively small diameter is centered in the colored lens 62. FIGS. 9 and 10 show lenses which are clear on one half, and colored on the remaining half, while FIGS. 11 and 12 show colored lenses 68 having colorless bands 70 thereacross. The lenses of FIGS. 9 or 11 could be designated "stop" signals and the colored lens portions made of red hue, while the lenses of FIGS. 10 or 12 could be "go" signals and the colored portions made a green hue, for example. FIGS. 13 and 16 show colored lenses 72, 84 with crossed colorless bands 74, 86, respectively. FIG. 14 shows a colored lens 76 with a plurality of colorless circles 78 of somewhat larger diameter than shown in FIG. 1. FIG. 15 shows a lens with a crosshatch pattern in which a grid of colored squares 80 is defined by colorless bands 82. FIG. 17 shows a lens design in which arcuate colorless segments 88 are provided in colored lens 90. Any of the foregoing patterns could be designated as having particular meaning as a traffic signal, such as "stop", "go" or "caution", and the colored portions colored accordingly.

It will be noted that in FIG. 3 the lens cap or cover 42 is positioned in front of the lens 40. It will be understood, however, that the cover could be positioned behind the lens or mounted directly on the face of a reflector-type bulb as well, with the openings 44 transmitting paths of light through the clear or translucent lens 40 to the oncoming motorist. The clearness of definition of the separate paths of light will depend to some extent on the thickness of the lens and the clear or translucent nature of the same, and in such arrangement an opaque lens cannot be employed if colored light is to be present during actuation of the signal.

In the lens cover designs of FIG. 4–14, 16 and 17, the openings in the cover are such as to provide a cover which is self-supporting, that is the openings are of a size and arrangement that the unitary construction of the cover is not impaired. Similar results can be obtained and designs achieved that are not inherently self-supporting, such as shown in FIG. 15, by applying a design to either the front or back face of the lens by special methods such as silk screening or painting through a template. Thus an initially thin liquid film can be applied to the surface of the lens in a pre-arranged design, with the film when dried defining areas of any desired design through which the light can be transmitted in paths to the oncoming motorist. This method of course eliminates the need for a separate lens cover, and the film can be translucent or opaque and can be colored red, amber or green. If the film is opaque, light detection will be provided solely by the paths of light transmitted through the openings defined by the opaque film. The film may also be of a metallic material, thereby creating a see-through mirror effect which permits light from the light bulb to pass outwardly from the traffic signal but prevents sunlight from passing through the lens. This eliminates a phenomenon known in the art as "phantom light", wherein sunlight shines through the lens, is reflected off the traffic signal reflector and redirected back through the lens. The "phantom" light can make it appear that the signal is lit when in fact it is not.

Figure 18:
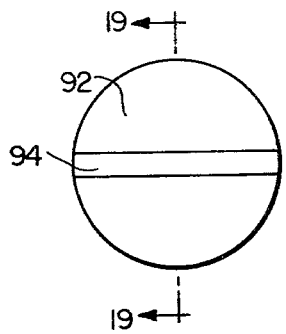
Figure 19:
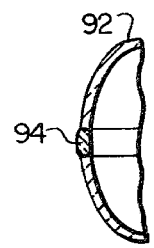
Figure 20:
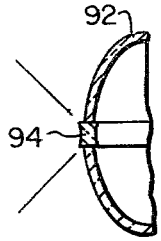
Figure 21:
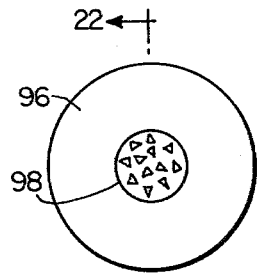
Figure 22:
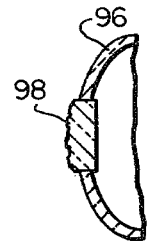

FIG. 18 shows a lens design similar to that of FIG. 11 in that a colorless band 94 passes across a portion of an otherwise colored lens 92, but differing from the FIG. 11 design in that clear lens portion 94 is provided with magnifying properties. FIG. 19 shows a cross-sectional view of the lens of FIG. 18 wherein clear lens portion 94 of colored lens 92 is inset into lens 92 and comprises a planoconvex lens for directing light from the light bulb filament and thus aiding motorists' visibility of the traffic signal condition. As shown in the cross-sectional view of FIG. 20, the inset clear lens portion of the lens of FIG. 18 may be of concave-concave design. Alternatively, the inset clear lens portion may be prismatic or multifaceted as shown in FIGS. 21 and 22. In FIGS. 21 and 22, the colored lens portion 96 has an insert portion 98 with a multifaceted surface, FIG. 22 being a cross-sectional view taken along line 22—22 of FIG. 21.

It will thus be seen that in all of the described forms of the invention, light is transmitted without color change through a portion of the lens or through a portion of the lens assembly, as in the FIG. 3 form of the invention. Such arrangement greatly facilitates detection of the "on" traffic light, and particularly by motorists with impaired vision. The invention can be practiced in the FIGS. 1–2 form of the invention by providing a conventional lens with openings therethrough, thereby not significantly adding to manufacturing costs. In the FIG. 3 form of the invention, the lens cap or cover is relatively inexpensive and accomplishes basically the same result. Any desired pattern of openings or perforations can be formed either in the lens member itself, the lens cover or cap, or defined by the film as described, with all of the patterns of openings accomplishing the same purpose of providing a constantly changing light pattern as the motorist approaches the traffic signal. It will be noted that the FIGS. 1–2 form of the invention achieves the additional advantage of providing cooling of the bulb 22 due to ambient air flow through the perforations 36 to the interior of the reflector 26.

In order to render the traffic light even more readily visible to motorists, separate bulbs or separate filaments within a bulb may be provided so that the colored and colorless lens portions are substantially independently illuminated. FIGS. 23–25 illustrate a single bulb 100 having dual filaments wherein a first filament 110 illuminates primarily the colored portion of a lens such as that of FIG. 20 and a second filament 114 illuminates primarily the clear portion of the lens.

In FIG. 23 is shown in right side view a bulb 100 having a base portion 102 for mounting the bulb and making the necessary electrical contacts to a power source. The bulb has a glass enclosure 104 and is mounted, as shown in FIGS. 1–3, in appropriate relation to a reflector 106 and a lens cover 108. A large, circularly arranged filament 110 is supported by conductive members 112, which provide power to the filament, while a smaller filament 114 is secured by conductive members 116. A saucer-shaped or substantially flat reflector or non-reflector 118 is held in position with respect to the filaments by support 120 such that light from filament 114 is concentrated in the central area of lens 108 and not permitted to be dissipated over the entire lens face by reflection off reflector 106. FIG. 24 shows the bulb of FIG. 23 in right, side view and illustrates further the spatial relation between filaments 110 and 114 and reflector 118. Members 116 are shown passing through openings in reflector 118. It will be understood that the bulb of FIGS. 23 and 24 may be fabricated in any manner known in the art, so long as the relation between filaments 110 and 114, and reflector 118, is maintained. The bulb enclosure may be clear, frosted or tinted, the filaments may be of tungsten or an alloy thereof, the bulb may be pressurized with argon or halogen gas or the like, or the bulb may be a quartz-iodine type. It will also be understood that the illustrated screw-type base 102 could be substituted with a bayonet or other type base and that the described filament arrangement could be positioned in a reflector-type glass lamp enclosure having integrally formed reflector 106 and/or lens 108 components.

In a preferred embodiment of the bulb of FIGS. 23 and 24, means is provided within the bulb for having either or both filaments intermittently flashing. FIG. 25 illustrates one arrangement whereby this may be effected. Electrical power is supplied to both filaments from a source, the power to filament 114, for example, passing through bimetallic switch 124. The bimetal portion of switch 124 is sufficiently heated by the radiation of both filaments to cause it to open the switch contacts, thereby shutting off power to filament 114. The bulb then cools sufficiently to cause re-closing of the switch contacts, and the cycle repeats. Since bimetal switches are well known, no more detailed explanation of the switch 124 is deemed necessary here. Those skilled in the art will, however, recognize that either or both of the filaments may be connected in series with bimetal switch 124 so that corresponding intermittent illumination of the respective portions of lens 108 will result.

It will be understood by those skilled in the art that the lens arrangements described above for use in conventional traffic signals are equally applicable for use in motor vehicle taillights. The colored lens of a conventional taillight could be either perforated to allow rays of colorless light to travel through the lens in a predetermined pattern, or the taillight lens may be replaced with a new lens constructed in one of the forms described above for traffic light lenses. For example, a clear taillight lens having a printed or silk-screened pattern thereon could be used in place of the conventional taillight lens. Alternatively a clear lens with a perforated, colored film or cover could be provided in place of the conventional taillight lens. The pattern of perforations may be varied so that following motorists with vision difficulties can easily distinguish the lens patterns for stop, turn, and emergency flasher taillights on the motor vehicle. A bulb of the type described above with respect to FIGS. 23-25 may also be used in conjunction with such a taillight lens in order to further enhance the effect of the associated lens.

I claim:

1. A signal device of the type in which at least one light transmitting means is provided to emit a visual signal to motorists, the improvement comprising lens means associated with and covering said light transmitting means, said lens means being transparent or translucent and of a desired color and including at least two perforations extending entirely through said lens means perpendicular to the plane of said lens means and being uncovered at the front surface of the lens means, said perforations being arranged in a predetermined pattern and being of sufficient dimensional area so as to visually interrupt light projected horizontally by said light transmitting means through said lens means, whereby the light transmitted through said lens means is of such desired color where no perforations appear and is of the color of said light transmitting means in the perforated area in accordance with said pattern, thereby facilitating recognition of the signal by motorists by providing a constantly changing light pattern as a motorist approaches the signal device.

2. The signal device of claim 1 wherein said lens means includes faceted insert means positioned in at least one of said perforations for altering the direction of light rays passing therethrough.

3. The signal device of claim 1 wherein said lens includes magnifying means positioned in at least one of said perforations for altering the direction of light rays passing therethrough.

4. The signal device of claim 1 wherein said light transmitting means is intermittently illuminated, whereby motorists encounter flashing light rays arranged in said pattern.

5. The signal device of claim 4 wherein said light transmitting means comprises a plurality of filaments, at least one of said filaments being positioned for shining light through a particular one of said perforations, and said at least one filament being connected for intermittently providing illumination.

6. The signal device of claim 1 wherein a plurality of light transmitting means and associated lens means are provided, mounted in a traffic signal housing and adapted to be sequentially actuated to provide traffic direction to oncoming motorists.

7. The signal device of claim 1 in which said light transmitting means is mounted in a housing adapted to be secured to the rear of a vehicle for functioning as a taillight.

8. The signal device of claim 1 wherein said lens has a relatively flat inner face and a slightly convex outer face, and wherein said perforations are spread relatively uniformly throughout said lens means so as to provide a relatively wide area of projected light thereby to enhance the sparkling affect.

9. A signal device of the type in which at least one light transmitting means is provided to emit a visual signal to motorists, the improvement comprising lens means associated with and covering said light transmitting means, said lens means being transparent or translucent and of a desired color and including at least one peforation extending entirely through said lens means perpendicular to the plane of said lens means, said at least one perforation being of sufficient dimensional area so as to visually interrupt light projected horizontally by said light transmitting means through said lens means and being uncovered at the front surface of the lens means, whereby the light transmitted through said lens means is of such desired color where no perforation appears and is of the color of said light transmitting means in the perforated area, thereby facilitating recognition of the signal by motorists, by providing a constantly changing light pattern as a motorist approaches the signal device.

10. The signal device of claim 9 wherein said at least one perforation comprises a single opening in said lens substantial in diameter and located centrally of the lens.

11. The signal device of claim 10 wherein said lens means includes faceted insert means positioned in said opening for altering the direction of light rays passing therethrough.

12. The signal device of claim 10 wherein said lens includes magnifying means positioned in said opening for altering the direction of light rays passing therethrough.

13. The signal device of claim 10 wherein said light transmitting means is intermittently illuminated, whereby motorists encounter flashing light rays through said opening.

14. The signal device of claim 10 wherein said light transmitting means comprises more than one filament, at least one of said filaments being positioned for shining light through said at least one perforation, and at least one said filament being connected for intermittently providing illumination.

15. The signal device of claim 10 wherein a plurality of light transmitting means and associated lens means are provided, mounted in a traffic signal housing and adapted to be sequentially actuated to provide traffic direction to oncoming motorists.

16. The signal device of claim 10 in which said light transmitting means is mounted in a housing adapted to be secured to the rear of a vehicle for functioning as a taillight.

17. The signal device of claim 9, wherein said lens means has a relatively flat inner face and a slightly convex outer face.

* * * * *